J. H. CHAMBERS.
MACHINE FOR MAKING TAPERED OR CONICAL CIGARS OR CIGARETTES.
APPLICATION FILED OCT. 3, 1912.
1,124,860.
Patented Jan. 12, 1915.
8 SHEETS—SHEET 1.
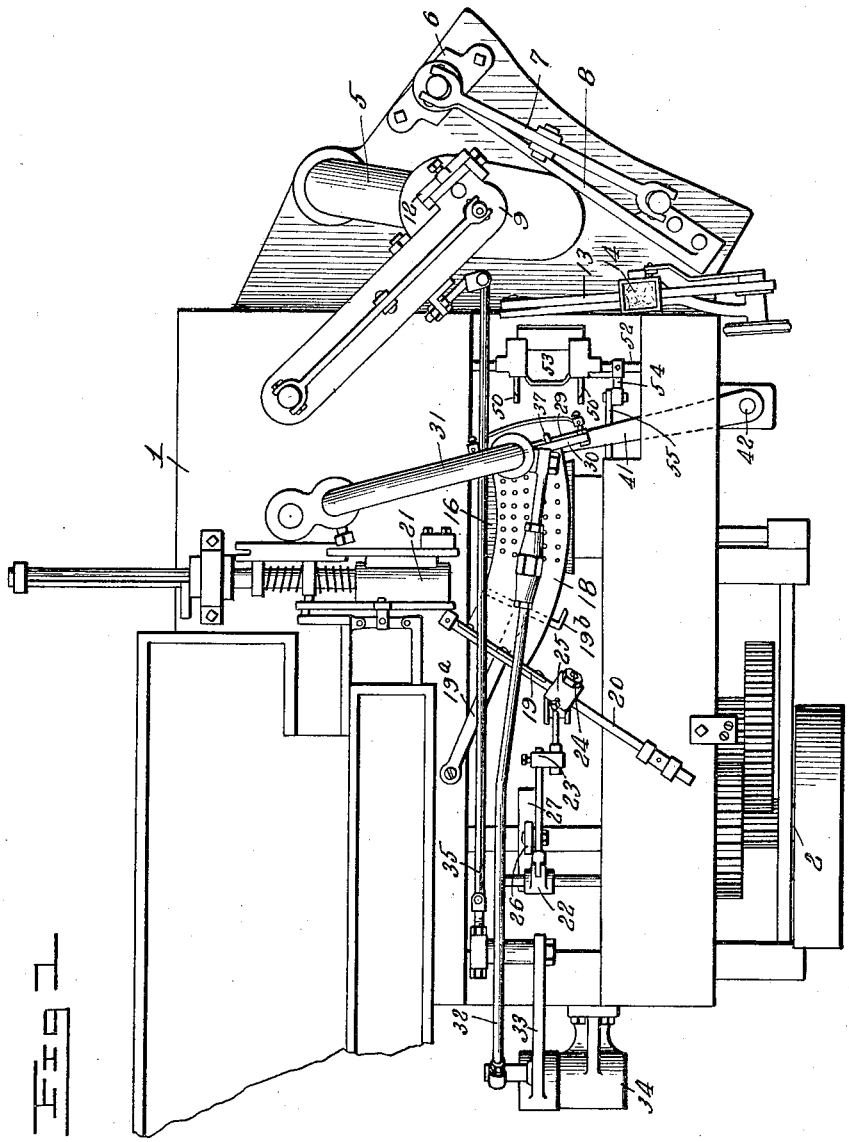
Witnesses
Inventor
James H. Chambers
By Meyers, Cushman & Rea
Attorneys J. H. CHAMBERS.
MACHINE FOR MAKING TAPERED OR CONICAL CIGARS OR CIGARETTES.
APPLICATION FILED OCT. 3, 1912.
1,124,860.
Patented Jan. 12, 1915.
8 SHEETS—SHEET 2.
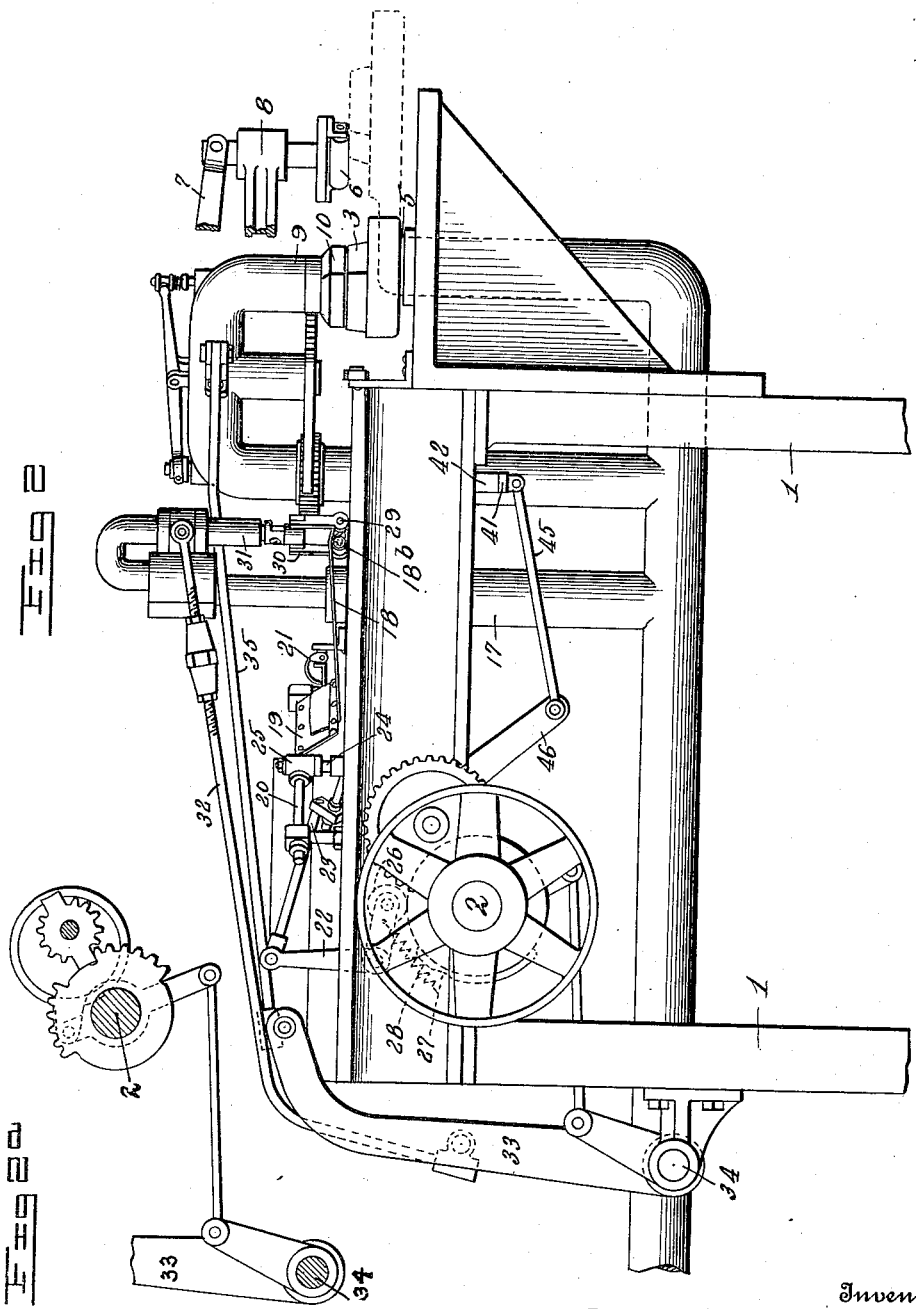
Inventor
James H. Chambers
Witnesses
By Meyers, Cushman & Rea
Attorneys

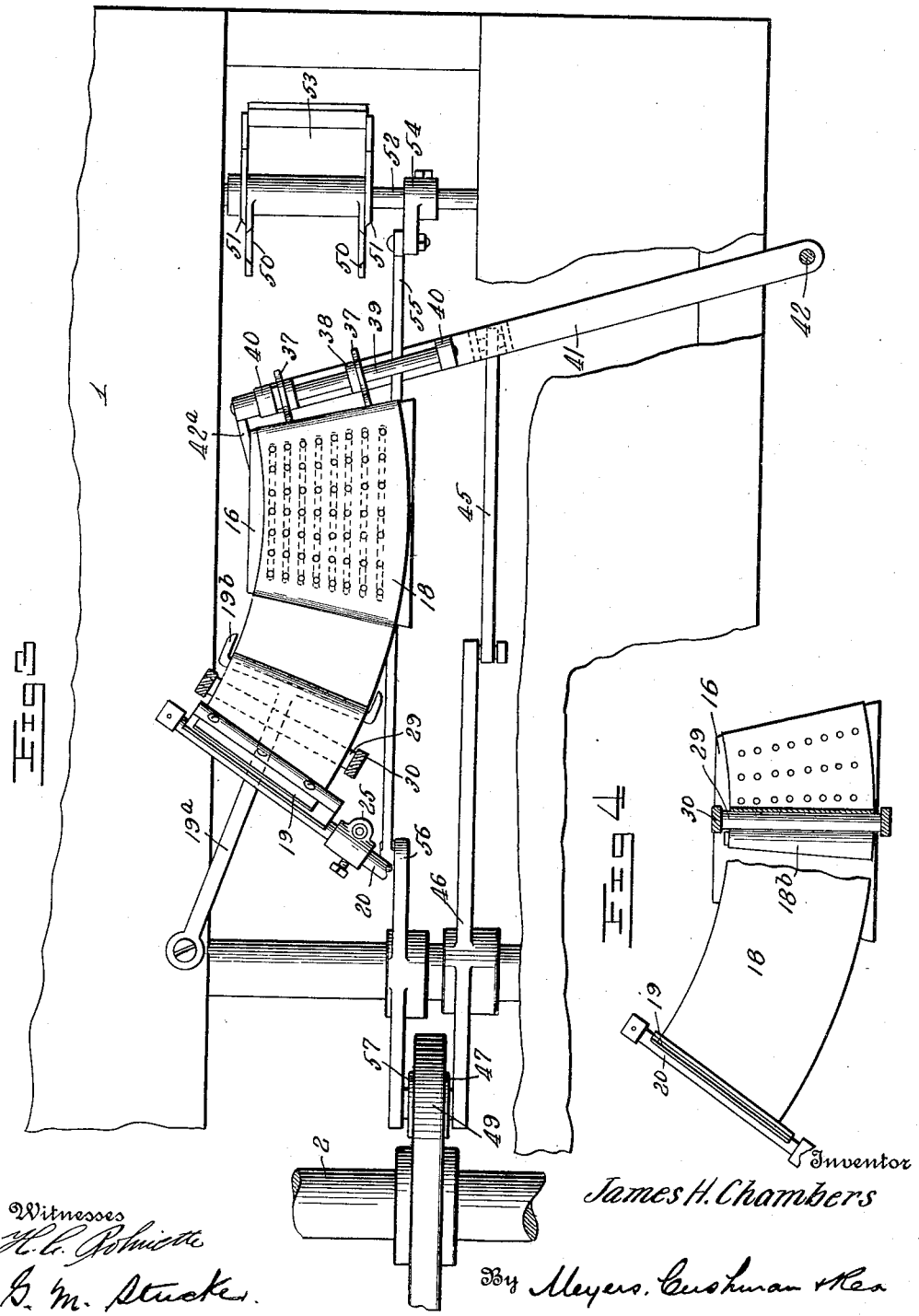

J. H. CHAMBERS.
MACHINE FOR MAKING TAPERED OR CONICAL CIGARS OR CIGARETTES.
APPLICATION FILED OCT. 3, 1912.
1,124,860.
Patented Jan. 12, 1915.
8 SHEETS—SHEET 4.
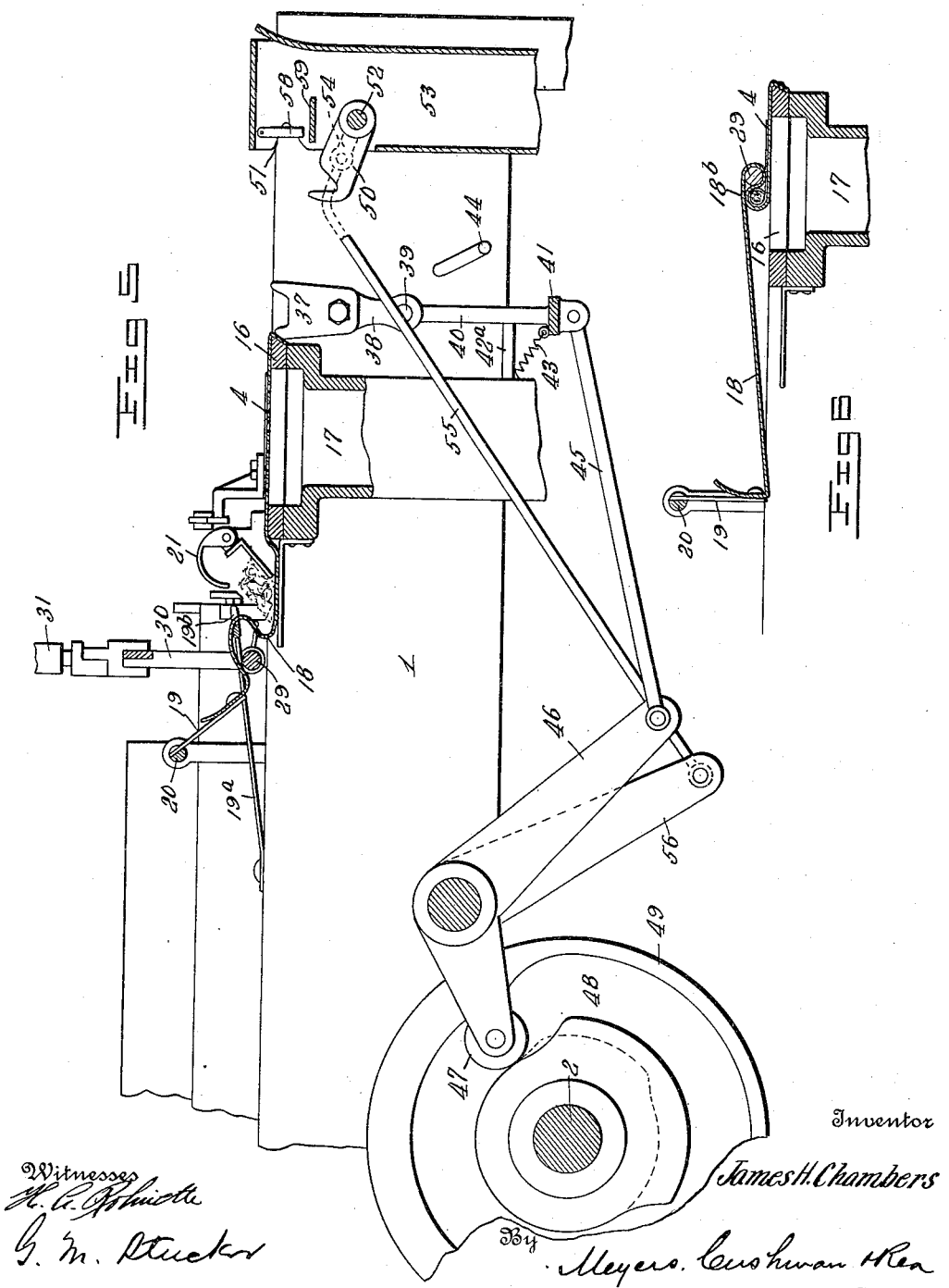

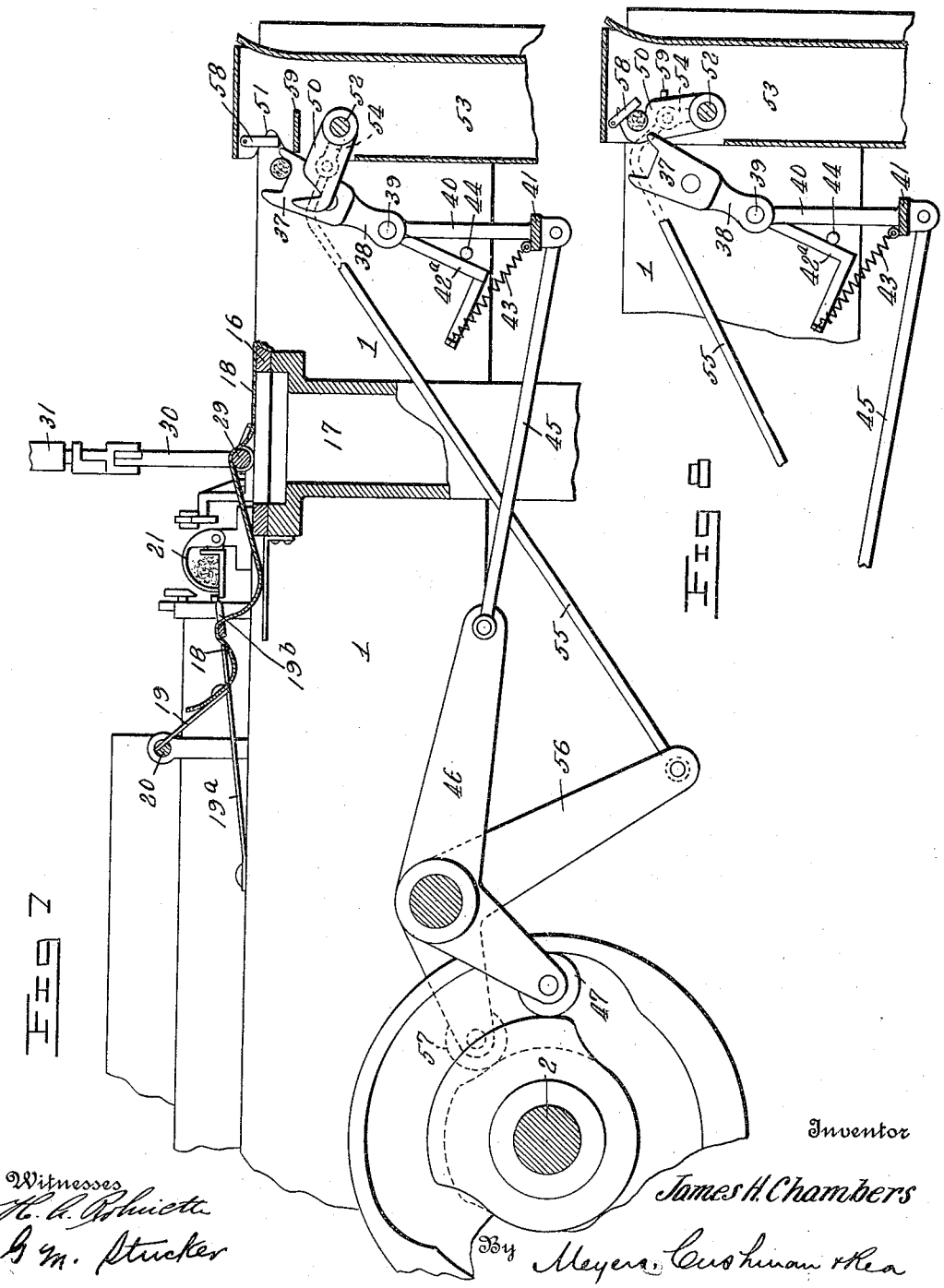

J. H. CHAMBERS.
MACHINE FOR MAKING TAPERED OR CONICAL CIGARS OR CIGARETTES.
APPLICATION FILED OCT. 3, 1912.
1,124,860.
Patented Jan. 12, 1915.
8 SHEETS—SHEET 6.
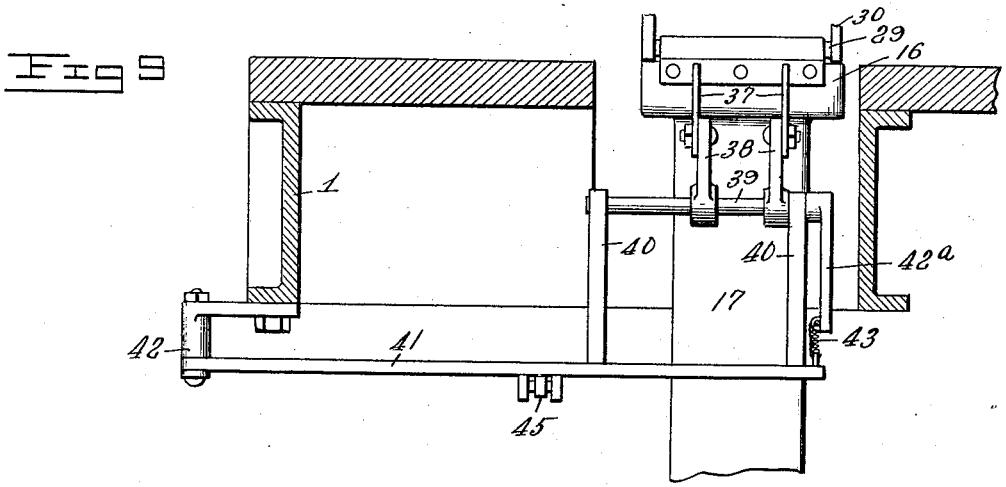
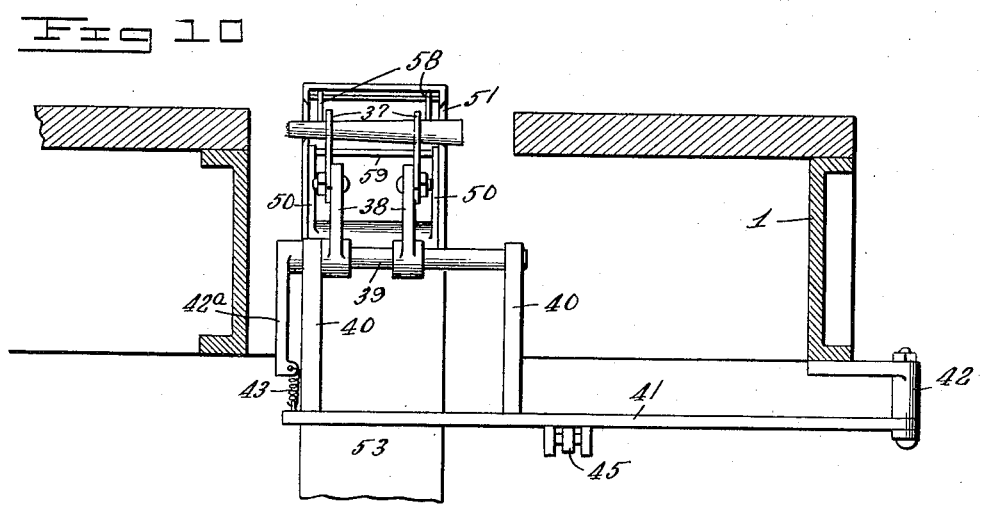
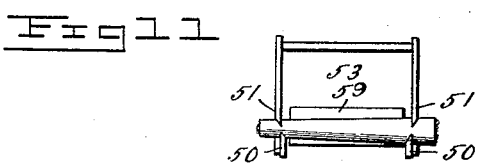
Inventor
James H. Chambers
Witnesses
By Meyers, Cushman & Rea
Attorneys

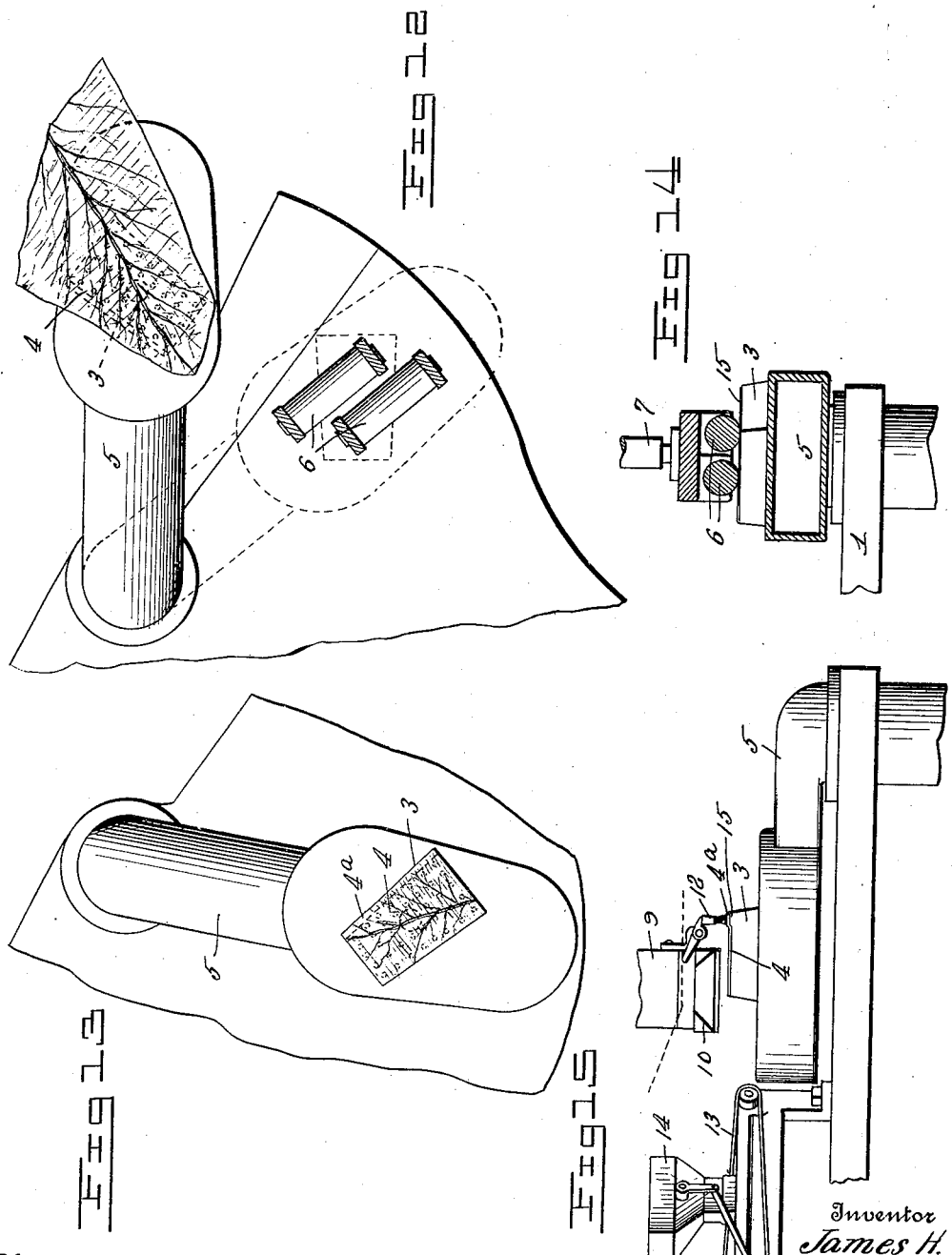

J. H. CHAMBERS.
MACHINE FOR MAKING TAPERED OR CONICAL CIGARS OR CIGARETTES.
APPLICATION FILED OCT. 3, 1912.
1,124,860.
Patented Jan. 12, 1915.
8 SHEETS—SHEET 8.
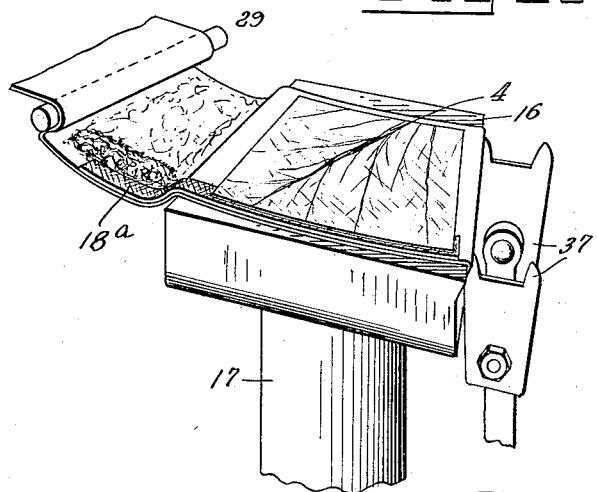
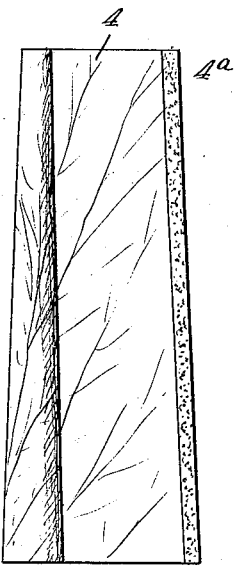
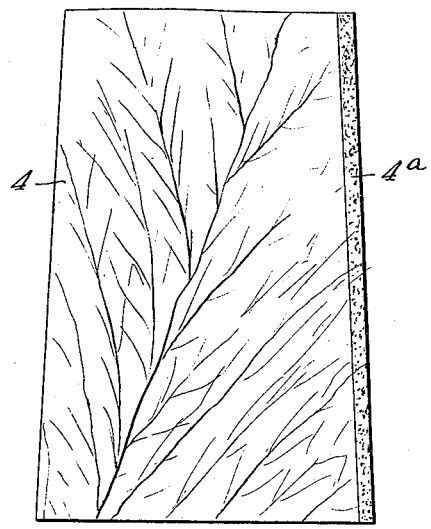
Inventor
James H. Chambers
Witnesses
By Meyers, Cushman & Rea
Attorneys

UNITED STATES PATENT OFFICE.

JAMES H. CHAMBERS, OF BALTIMORE, MARYLAND, ASSIGNOR TO P. LORILLARD & CO., OF JERSEY CITY, NEW JERSEY, A CORPORATION OF NEW JERSEY.

MACHINE FOR MAKING TAPERED OR CONICAL CIGARS OR CIGARETTES.

1,124,860.  Specification of Letters Patent.  Patented Jan. 12, 1915.

Application filed October 3, 1912. Serial No. 723,728.

*To all whom it may concern:*

Be it known that I, JAMES H. CHAMBERS, a citizen of the United States, residing at Baltimore, in the State of Maryland, have invented new and useful Improvements in Machines for Making Tapered or Conical Cigars or Cigarettes, of which the following is a specification.

The present invention relates to certain new and useful improvements in machines for making what have come to be known in the trade as "little cigars," and more particularly to little cigars of tapered or conical form.

I am aware that machines for making conical or tapered cigars and cigarettes are not broadly new so far as the patented art is concerned, but for various reasons not necessary to be dealt with here, such prior patented machines have not, to my knowledge, been put to practical use.

The object of the present invention is to combine in a simple and practical way certain correlated mechanisms that coöperate to measure a charge of tobacco that is to constitute the filler; to cut and transfer a wrapper of novel shape to a rolling mechanism; to roll the wrapper about the charge to form a conical or tapered cigar or cigarette; to convey the rolled cigar or cigarette to an end trimming mechanism and to then trim the ends of the cigar or cigarette.

The mechanisms necessary to perform the operations just mentioned, are combined and associated, according to the present invention, in a novel and practical way so that they are caused to operate automatically and in regular sequence, and while I have shown my improvements associated with a known type of machine, I do not wish to be understood as limiting myself to the exact arrangement illustrated, as I am aware that changes or modifications may be made without departing from the spirit of the invention.

In order to enable others skilled in the art to make and use my said improvements, I will now proceed to describe the same in detail, reference being made for this purpose to the accompanying drawings wherein:

Figure 1 is a plan view of the improved mechanism embodying the characteristic features of the invention. Fig. 2 is a front elevation of Fig. 1, some parts omitted for clearance. Fig. 2ª is a detail view of the means for imparting movements to the apron roller. Fig. 3 is a plan view of portions of the apron rolling mechanism and end trimming mechanism. Fig. 4 is a plan view of a portion of the rolling mechanism showing the conical loop. Fig. 5 is a horizontal section through the cigarette forming, transferring and end-trimming mechanism. Fig. 6 is a detail view showing a cigarette in the act of being rolled. Fig. 7 is a view similar to Fig. 4 showing the transfer and end trimmers in a different position. Fig. 8 is a detail view showing the cigarette in the act of being trimmed. Fig. 9 is a transverse section showing the cigarette transferring mechanism ready to receive a cigarette from the rolling mechanism. Fig. 10 is a similar view looking in the opposite direction, showing the cigarette in position for cutting. Fig. 11 is a detail plan illustrating the cutting operation. Fig. 12 is a detail plan view of the wrapper-cutting die with a section of wrapper material thereon. Fig. 13 is a similar view in advanced position, the wrapper having been cut to shape. Fig. 14 is a detail view showing the cutting die under the presser rolls. Fig. 15 is a detail view showing a pasting mechanism which may be used with the invention. Fig. 16 is a detail perspective of the rolling mechanism showing a tape on the belt for closing the large end of the cigarette during the rolling operation. Fig. 17 is a plan of the wrapper blank. Fig. 18 is a similar view of a cigarette partly rolled. Fig. 19 is a view of a rolled cigarette. Fig. 20 is a view of the finished article.

Referring to the accompanying drawing the reference numeral 1 designates the framework of the machine which may be of any suitable form or construction and upon which the operative parts of the machine are mounted, the latter being driven from the main power shaft 2 through suitable connections presently to be described.

As more clearly illustrated in Figs. 2, 12, 13, 14 and 15, the die 3 for cutting the cigar or cigarette wrapper 4, and which die has the shape of the wrapper to be cut, is carried by an arm 5, mounted to swing in the arc of a circle from a wrapper material receiving position to a position where the cut wrapper may be taken up by a wrapper carrier and delivered to the rolling mechanism. The swinging arm 5 is connected to a suitable suction creating means and the die 3 is perforated as shown in dotted lines in Fig. 12, so that the wrapper material, such as the tobacco leaf shown and the wrapper 4, that is cut therefrom, will be held to the die in a smooth and flat condition while being cut and carried to the wrapper carrier. In its movement from the wrapper receiving position to the wrapper carrier the die passes under a pair of presser rollers 6, mounted upon the lower end of a rod 7, carried by an arm 8, as usual in machines of this kind, the rollers serving with the die to cut the wrapper to the desired shape, which in the instance shown is of substantially key-stone form. Coöperatively associated with the said swinging die-carrying arm 5 is a wrapper carrier comprising, in the instance shown, a hollow arm 9 connected to a suitable suction creating device, said arm having a perforated suction head 10 adapted to move back and forth from a position over the die 3 to a position over the table and apron of the rolling mechanism to take the cut wrappers from the die and deliver them to the said rolling mechanism. The wrapper carrying arm 9, has a brush 12, mounted thereon, see Fig. 15, that is adapted to apply a stripe of paste along one of the longitudinal edges of the cut wrapper while the latter is on the die, the said brush receiving its supply of paste from an endless band 13, working through a paste-pot 14, as more clearly shown in Figs. 1 and 15, the said die having one of its longitudinal edges raised as at 15, to facilitate proper application of the paste along a certain definite area only of the wrapper.

The rolling mechanism, as more clearly illustrated in Figs. 3, 4, 5 and 6, comprises a slotted table or plate 16, mounted upon an exhaust trunk 17, that is connected to the said suction creating means hereinbefore referred to, and attached to one edge of said table or plate 16, is one end of a perforated rolling apron 18, said apron being curved or arched, or has the form of a segment of an annulus in outline or plan, and overlies the slotted plate 16 of the trunk 17, the other end of the apron being attached to a tension device comprising an oscillating plate 19, mounted upon a rock shaft 20, the said oscillating plate 19 and its shaft 20 being disposed at an angle less than a right angle to the path of movement to the tobacco filler delivery shuttle 21 presently to be described and as illustrated in Fig. 1. The apron 18 is curved or arched in outline as shown in order that the cigar or cigarette rolled thereby will take a tapered or conical form as distinguished from a truly cylindrical form, and the ends of the belt are cut away on radial lines converging toward the center of the arc on which the sides of the belt are struck.

Motion is imparted to the rock shaft 20, to alternately tighten and slacken the belt 18 by means of a bell-crank lever 22, having an adjustable rod-connection 23, at one end with an arm 24 extending outward from a bracket 25 attached to the shaft 20. The other end of the bell-crank lever carries a roller 26 that is adapted to be acted upon by a cam 27 mounted upon the power shaft 2. The roller end 26, of the bell-crank lever is normally maintained in contact with the cam 27 by means of tension spring 28, as more clearly illustrated in Fig. 2.

If desired I may attach a tape or in some other convenient way provide a shoulder 18$^a$ along the longer of the longitudinal edges of the apron 18, in order to close the larger end of the cigarette during the rolling operation and thus prevent the filler from being forced out, all as more clearly shown in Fig. 16.

Coöperatively associated with the apron 18, is the apron-roller 29, said roller being mounted in a yoke 30, carried by a swinging arm 31, that moves back and forth in the arc of a circle beneath the belt 18, and coöperates therewith and with the apron tension device to produce a tapered or conical loop 18$^b$ in the belt whereby to effect the cigar or cigarette rolling operation. The pivotal point of the swinging arm 31, that carries the roller 29, is the center from which the curved sides of the apron 18 are struck, hence the path of movement described by the roller 29 corresponds to the outline of the apron 18.

The roller 29 is moved back and forth under the apron in a curved path by means of an adjustable or extensible rod 32, connected at one end to the swinging arm 31, on which the roller is mounted, and at its other end to an oscillating lever 33, pivoted at 34, to a bracket attached to the machine frame as more clearly illustrated in Fig. 2, motion being imparted to the said lever from the power shaft 2, and preferably through the medium of a Geneva wheel as more clearly shown in Fig. 2$^a$. The arm 9 to which the wrapper carrying head 10 is attached, is also connected to and is moved to and from the wrapper receiving and wrapper delivering positions by means of the lever 33, the connection being by means of a rod 35, connected at one end to the free end of said lever and at its other end to said arm. It will thus be seen that the oscillating lever 33, imparts motion to both the roller carrying arm and the wrapper carrier.

In order to facilitate the formation of the loop 18$^b$ in the apron 18, and avoid undue buckling of the apron adjacent the point where it is attached to the tensioning device, I provide an apron lifting device which comprises in the instance shown, a spring arm 19ᵃ attached at one end to the machine frame as shown in Figs. 1 and 3, and having its other end forked at 19ᵇ so as to embrace the opposite edges of the apron and normally act to yieldingly lift the apron and thus permit the roller 29 to ride under the same at the point where the loop is to be formed, as more clearly shown in Fig. 5.

The machine as thus far described operates as follows: The operator first places a portion of a tobacco leaf or other wrapper material over the die 3, while the latter is in its outer position as indicated in Figs. 2 and 12. The die is then moved by suitable mechanism, (not shown) beneath and in contact with the rollers 6, which act to cut the wrapper from the leaf, the die continuing to move toward the left, Fig. 2, until it comes under the suction head 10, of the wrapper carrier and then stops. The wrapper carrier now begins to move toward the left Fig. 2, the wrapper having been picked up by suction and now clinging in a flat and smooth state to said head, and the latter continues its movement until it overlies the perforated portion of the rolling apron situated over the suction trunk 17. Suction at this point is broken in the head 10, and created in the trunk 17, through the perforations in the apron, which serves to transfer the wrapper from the head to the apron where it is also held in a smooth and flat condition. During these operations the apron roller has moved to the position indicated in Fig. 5. The tobacco delivery shuttle with its charge of filler tobacco now moves forward over the apron by some suitable means, not shown, but which is coupled to a moving part of the machine and discharges its filler supply upon the apron transversely thereof, as shown in Fig. 5, the apron having been sufficiently slackened to provide a flat portion 36, to one side of the plate 16, to properly receive the charge. The shuttle having been withdrawn, the apron roller now begins to move toward the right Fig. 5, in the arc of a circle, and at the same time the apron tensioning plate moving to the left, a loop 18ᵇ, Fig. 4, of tapered or conical form, is made in the apron which incloses the charge of tobacco and maintains it in the form of the finished cigar or cigarette. Continued movement of the apron roller brings the formed charge of tobacco over one end of the wrapper 4, lying upon the apron which is now rolled about the charge, the pasted end 4ᵃ, Figs. 17 and 18, of the wrapper finally sealing the wrapper and producing the tapered or conical cigar or cigarette Fig. 19, which now only remains to be cut off or trimmed at its ends to produce the finished product as illustrated in Fig. 20.

During the rolling operation just described the wrapper carrying head 10 is being moved back in position to receive a fresh wrapper from the cutting die 3 for another cigar and upon the return movement of the apron roller the said head delivers the wrapper to the apron as before, all the parts thus acting automatically and in regular sequence and in timed relation one with the other to produce the result stated.

From the rolling mechanism the cigar or cigarette with its untrimmed ends is delivered onto a conveying device which conveys it in position to be taken up and acted upon by end trimming mechanism to trim its ends and deliver the same to a suitable receiver. These means will now be described, reference being made more particularly to Figs. 3, 5, 7, 9, 10, 11 and 16.

The conveying device in the instance shown comprises a pair of upstanding fingers 37, each having its upper end cut out or recessed as shown more clearly in Figs. 5, 7 and 16, said fingers normally resting against the delivery end of the rolling apron in position to receive the cigarette therefrom. These fingers 37 are each mounted upon an arm 38, carried by a rock shaft 39 journaled in brackets or standards 40, rising from a lever 41, pivoted at 42, Figs. 9 and 10, to a bracket on the machine frame, the said lever 41 with its fingers moving in a horizontal plane in the arc of a circle opposite to that of the rolling apron to carry the fingers toward and from the end trimmers, and the fingers having a further movement in a vertical plane and in the arc of a circle at right angles to the sweep of the lever 41, in order to bring the fingers in proper coöperative relation with the end trimmers. To effect this compound movement of the transfer fingers 37, the rock shaft 39, upon which they are mounted is provided with a crank arm 42ᵃ, that has a yielding connection, as by a spring 43, with the lever 41. Arranged in the path of movement of the said crank-arm 42, is an outwardly projecting pin 44, see Fig. 5, with which the said crank-arm engages during the movement of the fingers toward the end trimmers. Immediately the crank-arm engages the said pin 44, the fingers will be rocked forward to the position illustrated in Figs. 7 and 8 which will bring the cigarette carried thereby in position to be taken up by the movable members of the end trimmers presently to be described. Movement is imparted to the lever 41, by means of a rod connection 45, with one arm of a bell-crank lever 46, the other arm of said bell crank lever carrying a roller 47 that rides in a cam groove 48, formed in one face of a disk 49, mounted upon the power shaft 2, as more clearly illustrated in Figs. 3 and 5.

The end trimming mechanism comprises a pair of movable blades 50, each notched as shown and a pair of fixed blades 51, also notched. The movable blades are mounted upon a rock-shaft 52, that passes through a delivery chute 53, the said blades normally assuming the position illustrated in Figs. 5 and 7. One end of the rock shaft 52, has a crank arm 54, shown in dotted lines in Figs. 5, 7, and 8, and in full lines Fig. 3, to the end of which a rod 55 is connected, the other end of the rod being joined to one arm of a bell-crank lever 56, the other arm of said lever carrying a roller 57, that plays in a cam groove formed in the face of the aforesaid disk 49. The cam groove is so formed and the movement of the parts so timed that the movable blades 50 of the end trimmers will be caused to move over in the arc of a circle from the position illustrated in Fig. 7, to the position illustrated in Fig. 8, immediately the transfer fingers have brought a cigarette in position to be acted upon by the trimmers, the movable blades lifting the cigarette from off the fingers and carrying the same through the space between the two fixed blades 51, the opposite ends of the cigarette being nipped off by the combined action of the two pairs of blades. Depending within the delivery chute 53, and arranged in the path of movement of the movable blades 50, are a pair or swinging abutments 58, that engage and support the body of the cigarette as it is being acted upon by the end trimming blades. Beneath the said abutments is a stop plate 59, against which the transfer fingers 37 strike and rest when said fingers have moved to the limit of their delivery position, as more clearly shown in Fig. 7.

From the foregoing description taken in connection with the accompanying drawings, it will be seen that I have provided a simple and compact arrangement of coöperating parts that operate automatically and in regular sequence to effect the operations of cutting a wrapper for a tapered or conical cigarette or cigar; transferring said wrapper to a rolling mechanism designed to roll the wrapper about the filler to produce the said conical or tapered cigar or cigarette; convey the cigar or cigarette thus rolled to an end trimming mechanism, and finally trim the ends thereof and deliver the finished cigarette into a chute.

While I have herein shown and described a preferred embodiment of the invention, I do not wish to be understood as limiting myself to the precise construction and arrangement of parts illustrated, except as I may be limited by the terms of the appended claims, as I am aware that minor changes to some of the parts may be made without departing from the spirit of the invention.

What I claim is:—

1. In a machine for making tapered or conical cigars or cigarettes, a wrapper cutting mechanism, including a movable cutting die shaped to cut a wrapper having two oppositely arranged converging edges and a presser roller with which the die coöperates, a rolling mechanism embodying an apron in the shape of a segment of an annulus and a coöperating roller movable in the arc of a circle, means movable in the arc of a circle for transferring the cigar wrapper from the cutting die to the rolling apron, and means for feeding tobacco to the said apron.

2. In a machine for making tapered or conical cigars or cigarettes, a wrapper cutting mechanism, including a die shaped to cut a wrapper that is wider at one end than at the other and a coöperating presser roller, a rolling mechanism embodying an apron in the shape of a segment of an annulus and a coöperating roller movable in the arc of a circle, means movable in the arc of a circle for transferring a cut wrapper from the cutting die to the rolling apron, means for feeding tobacco to the said apron, and power means for moving the parts in regular sequence.

3. In a machine for making tapered or conical cigars or cigarettes, a wrapper cutting mechanism, including a die shaped to cut a wrapper that is wider at one end than at the other and a coöperating presser roller, a rolling mechanism embodying an apron in the shape of a segment of an annulus and a coöperating roller movable in the arc of a circle, means movable in the arc of a circle for transferring a cigar wrapper from the cutting mechanism to the rolling apron, means for feeding tobacco to the said apron, and means for trimming the opposite ends of the cigar or cigarette after the same has been rolled.

4. In a machine for making cigars or cigarettes of tapered or conical form, a wrapper cutting mechanism, including a die shaped to cut a wrapper having converging edges and a roller with which the die coöperates, a rolling mechanism embodying an apron in the shape of a segment of an annulus and a coöperating roller movable in the arc of a circle, means movable in the arc of a circle for transferring a cigar wrapper from the cutting mechanism to the rolling apron, means for feeding tobacco to said apron, an end trimming mechanism, and means for tarnsferring the rolled cigar or cigarette from the apron to the said end trimming mechanism.

5. In a machine for making tapered or conical cigars or cigarettes, a wrapper cutting mechanism, including a movable die shaped to cut a wrapper wider at one end than at the other and a coöperating presser roller beneath which the die may move, a rolling mechanism embodying an apron in the shape of a segment of an annulus and a coöperating roller movable in the arc of a circle, said apron having a perforate portion, a suction trunk over which said perforate portion of the apron normally rests, means movable in the arc of a circle for transferring the cigar wrapper from the cutting mechanism to the perforate portion of the apron, and means for feeding tobacco to the apron.

6. In a machine for making tapered or conical cigars or cigarettes, a wrapper cutting mechanism, including a movable die shaped to cut a wrapper wider at one end than at the other and a coöperating presser roller beneath which the die may move, a rolling mechanism embodying an apron in the shape of a segment of an annulus and a coöperating roller movable in the arc of a circle, said apron having perforate and imperforate portions, a suction trunk over which the perforate portion of the apron normally rests, means movable in the arc of a circle for transferring a cigar wrapper from the cutting mechanism and delivering it onto the perforate portion of the apron, and means for depositing a charge of tobacco upon the imperforate portion of the apron.

7. In a machine for making tapered or conical cigars or cigarettes, a wrapper cutting mechanism, including a movable die shaped to cut a wrapper wider at one end than at the other and a coöperating presser roller beneath which the die may move, a rolling mechanism embodying an apron in the shape of a segment of an annulus, said apron having a perforate and an imperforate portion, means movable in the arc of a circle for transferring the cigar wrapper from the cutting mechanism and depositing it upon the perforate portion of the apron, means for delivering a charge of tobacco to the imperforate portion of the apron transversely thereof, an apron roller coöperatively associated with the apron, and means for moving the roller back and forth in the arc of a circle.

8. In a machine for making tapered or conical cigars or cigarettes, a wrapper cutting mechanism embodying a suction arm movable in the arc of a circle and a coöperating presser roller, a rolling mechanism embodying an apron in the shape of a segment of an annulus, a tensioning device attached to one end of said apron, a roller coöperatively associated with the apron, means for moving the roller in one direction in the arc of a circle, and means for simultaneously operating the tensioning device to apply tension to the apron.

9. In a machine for making tapered or conical cigars or cigarettes, a wrapper cutting mechanism embodying a swinging arm having a suction head facing upwardly and a coöperating presser roller, a rolling mechanism embodying an apron in the shape of a segment of an annulus, said apron having perforate and imperforate portions, a suction trunk, over which the perforate portion of the apron normally lies, an apron roller coöperatively associated with the apron, means for moving the roller in one direction in the arc of a circle to roll the cigar or cigarette, a tensioning device attached to one end of the apron, means for operating said tensioning device to apply tension to the apron while the roller is performing the rolling operation, and means for delivering a charge of tobacco upon the imperforate portion of the apron.

10. In a machine for making tapered or conical cigars or cigarettes, a wrapper cutting mechanism embodying a swinging arm having a suction head facing upwardly and a coöperating presser roller, a rolling mechanism embodying an apron in the shape of a segment of an annulus, said apron having perforate and imperforate portions, a suction trunk over which the perforate portion of the apron normally lies, means embodying a suction head facing downwardly and movable in the arc of a circle for delivering a wrapper from the cutting mechanism onto the perforate portion of the apron, means for delivering a charge of tobacco upon the imperforate portion of the apron, a tensioning device attached to one end of the apron, an apron roller coöperatively associated with the apron, means for moving the apron roller in one direction in the arc of a circle, and means for simultaneously operating the tensioning device to impart tension to the apron during the forward movement of the apron roller.

11. In a machine for making tapered or conical cigars or cigarettes, a wrapper cutting mechanism, a roller mechanism embodying an apron in the shape of a segment of an annulus, said apron having a perforate and an imperforate portion, a suction trunk upon which the perforate portion of the apron normally rests, means embodying a suction head movable in the arc of a circle for transferring a cut wrapper from the cutting mechanism onto the perforate portion of the apron, means for delivering a charge of tobacco upon the imperforate portion of the apron, an apron roller coöperatively associated with the apron and moving in the arc of a circle, and a tensioning device for the apron comprising an oscillating plate and a rock shaft for imparting oscillatory movement to said plate.

12. In a machine for making tapered or conical cigars or cigarettes, a wrapper cutting and transferring mechanism embodying coöperating suction heads facing in opposite directions and each movable in the arc of a circle, a rolling mechanism embodying an apron in the shape of a segment of an annulus, said apron having a perforate and an imperforate portion, a suction trunk upon which the perforate portion of the apron normally rests, an apron roller coöperatively associated with the apron, means for moving the roller in the arc of a circle to form a tapered or conical loop in the apron, an apron tensioning device attached to one end of the apron, and an apron lifting device normally maintaining one end of the apron elevated.

13. In a machine for making tapered or conical cigars or cigarettes, a wrapper cutting and transferring mechanism embodying coöperating suction heads facing in opposite directions, and each movable toward and from each other in the arc of a circle, a rolling mechanism embodying an apron in the shape of a segment of an annulus, said apron having a perforate and an imperforate portion, a suction trunk upon which the perforate portion of the apron normally rests, a shuttle for delivering a charge of tobacco upon the imperforate portion of the apron, an apron roller coöperatively associated with the apron, means for moving the roller in the arc of a circle, a tensioning device attached to one end of the apron, means for operating the tensioning device to impart tension to the apron during the rolling operation, and a yielding apron lifter normally acting to lift an end of the apron when the tensioning device is idle.

14. In a machine for making tapered or conical cigars or cigarettes, a wrapper cutting mechanism, including a movable die shaped to cut a wrapper narrower at one end than at the other and a coöperating roller with which the die makes contact during forward movement thereof, a rolling mechanism embodying an apron in the shape of a segment of an annulus, said apron having perforate and imperforate portions, a suction trunk upon which the perforate portion of the apron normally rests, a suction head for transferring a wrapper from the cutting mechanism and depositing it upon the perforate portion of the apron, means for moving the suction head in the arc of a circle toward and from the apron, means for delivering a charge of tobacco upon the imperforate portion of the apron, an apron roller coöperatively associated with the apron and moving in the arc of a circle, and an apron tensioning device coöperatively associated with one end of the apron.

15. In a machine for making tapered or conical cigars or cigarettes, a wrapper cutting and transferring mechanism, a rolling mechanism comprising an apron in the shape of a segment of an annulus, said apron having a perforate and an imperforate portion, a suction trunk upon which the perforate portion of the apron normally rests, a shuttle for delivering a charge of tobacco upon the imperforate portion of the apron, a suction head movable in the arc of a circle for transferring the wrapper from the cutting mechanism and delivering it upon the perforate portion of the apron, an apron roller coöperatively associated with the apron to form a tapered or conical loop therein, and means common to the said roller and the said suction head for moving these elements in the arc of a circle.

16. In a machine for making tapered or conical cigars or cigarettes, a wrapper cutting and transferring mechanism, a rolling mechanism embodying an apron in the shape of a segment of an annulus, said apron having a perforate and an imperforate portion, a suction trunk upon which the perforate portion of the apron normally rests, means for feeding a charge of tobacco and delivering it upon the apron, a suction head movable in the arc of a circle for transferring the wrapper from the cutting mechanism and delivering it upon the apron, an apron roller coöperatively associated with the apron and operating to form a tapered or conical loop therein, an oscillating lever, and separate connections between said lever and the said roller and suction head respectively, to move these elements simultaneously in the arc of a circle.

17. In a machine for making tapered or conical cigars or cigarettes, a wrapper cutting and transferring mechanism, a rolling mechanism embodying an apron in the shape of a segment of an annulus, an apron roller coöperatively associated with said apron and movable in the arc of a circle to form a tapered or conical loop therein, means movable in the arc of a circle for transferring a cigar wrapper from the cutting mechanism to the said apron, means for feeding a charge of tobacco to the apron, two pairs of spaced end cutting blades, and a pair of transferring fingers having successive movements describing horizontal and vertical arcs for transferring the rolled cigar or cigarette from the apron to the said cutting blades.

18. In a machine for making tapered or conical cigars or cigarettes, a wrapper transferring and cutting mechanism, a rolling mechanism embodying an apron in the shape of a segment of an annulus, said apron having a perforate portion, a suction trunk upon which the perforate portion of the apron normally rests, an apron roller coöperatively associated with the apron, means for moving the roller in the arc of a circle, means movable in the arc of a circle for transferring a wrapper from the cutting mechanism to the rolling apron, means for feeding a charge of tobacco to the apron, an end trimming mechanism for the cigar or cigarette comprising a pair of fixed and a pair of movable blades, and means movable in the arc of a circle describing a horizontal path for transferring a cigar or cigarette from the rolling mechanism to the said end trimming mechanism.

19. In combination with the rolling mechanism of a cigar or cigarette machine, end trimming mechanism comprising a pair of fixed and a pair of coöperating movable cutting blades, and means movable in the arc of a circle describing a horizontal path for transferring a cigar or cigarette from the rolling mechanism to the said trimming mechanism.

20. In combination with the rolling mechanism of a cigar or cigarette machine, end trimming mechanism comprising a pair of fixed blades and a pair of coöperating movable blades, and a transferring device comprising a pair of fingers having notched ends to receive the rolled cigar or cigarette and transfer the same from the rolling mechanism into position to be engaged by the movable blades of the end trimming mechanism and a pivoted arm movable in the arc of a circle describing a horizontal path upon which said fingers are mounted.

21. In combination with the rolling mechanism of a cigar or cigarette machine, an end trimming mechanism comprising a pair of fixed and a pair of movable cutting blades, means for moving the said movable blades toward and from the fixed blades, a transferring device for the rolled cigar or cigarette comprising a pair of fingers having notched ends to receive the rolled cigarette, and means for moving the said fingers in the arc of a circle and in a horizontal plane to cause them to assume a position over the said movable blades, where the latter will lift the cigar or cigarette and carry it from off said fingers into contact with the fixed blades.

22. In combination with the rolling mechanism of a cigar or cigarette machine, of an end trimming mechanism comprising a pair of fixed blades and a pair of coöperating movable blades having alined notches and a transferring device movable back and forth in a horizontal plane between the rolling mechanism and the end trimming mechanism, said transferring device comprising a pair of fingers, and means for tilting the fingers during their movement from the rolling mechanism to the end trimming mechanism to deliver the cigar or cigarette into the notched portion of said movable blades.

23. In combination with the rolling mechanism of a cigar machine, of an end trimming mechanism for trimming the ends of the rolled cigars, and a transferring device comprising a pair of fingers movable back and forth in a horizontal plane between the rolling mechanism and the end trimming mechanism, and means for tilting said fingers in a vertical plane toward the end of the delivery movement.

24. In combination with the rolling mechanism of a cigar machine, of an end trimming mechanism, and a transferring device for transferring the rolled cigar from the rolling mechanism to the trimming mechanism, said transferring device comprising a pair of fingers, means for moving the fingers in a horizontal plane, and a pivoted arm with which said fingers have a pivotal connection, whereby they may be rocked in a vertical plane to bring the cigar carried thereby into position to be engaged and lifted by members of the trimming mechanism.

25. In combination with the rolling mechanism of a cigar machine, of an end trimming mechanism, and a transferring device for transferring the rolled cigar from the rolling mechanism to the trimming mechanism, said transferring device comprising a pair of fingers, means for moving the fingers in a horizontal plane and a pivoted arm with which said fingers have a yielding pivotal connection.

26. In combination with the rolling mechanism of a cigar machine, of an end trimming mechanism comprising a pair of fixed cutting blades and a pair of coöperating movable cutting blades, a delivery chute within the upper portion of which said trimming mechanism is located, means for transferring the rolled cigar from the rolling mechanism to the end trimming mechanism, and an abutment for the cigar located within the chute adjacent the fixed cutting blades.

27. In combination with the rolling mechanism of a cigar machine, of an end trimming mechanism comprising a pair of fixed cutting blades and a pair of coöperating movable cutting blades, a delivery chute within the upper portion of which said trimming mechanism is located, means for transferring the rolled cigar from the rolling mechanism to the end trimming mechanism, and pivotal abutments arranged within the chute adjacent the fixed cutting blades and in the path of movement of the cigar.

28. In a machine for making tapered or conical cigars or cigarettes, a wrapper cutting and transferring mechanism, a rolling mechanism embodying an apron in the shape of a segment of an annulus, said apron having an enlargement along one of its longitudinal edges, means for transferring the cigar wrapper from the cutting mechanism to the rolling apron, and means for feeding tobacco to said apron.

29. In a machine for making tapered or conical cigars or cigarettes, a wrapper cutting and transferring mechanism embodying a suction die, and a swinging arm on which said die is mounted, a rolling mechanism embodying an apron in the shape of a segment of an annulus, said apron having a perforate and an imperforate portion, a suction trunk upon which the perforate portion of said apron normally lies, a pivoted suction head for transferring a cut wrapper from the said suction die to the perforate portion of the apron, an apron roller coöperatively associated with the apron, a swinging arm upon which said roller is mounted, an apron tensioning device attached to one end of the apron, an oscillating lever, and separate connecting rods each attached at one end to said lever, and at its other end respectively, to the pivoted suction head and the said swinging arm.

30. In a machine for making tapered or conical cigars or cigarettes, a wrapper cutting and transferring mechanism, a rolling mechanism embodying an apron in the shape of a segment of an annulus, an apron roller coöperatively associated with the apron, means for moving the roller in the arc of a circle, and an apron tensioning device comprising a radially arranged oscillating plate attached to one end of the apron, and means for oscillating said plate to tension the apron.

31. In a machine for making tapered or conical cigars or cigarettes, a rolling mechanism embodying an apron in the shape of a segment of an annulus and a coöperating roller movable in the arc of a circle, a wrapper cutting mechanism including a movable suction head, a die carried thereby and a roller beneath which said suction head may move with the die making cutting contact with the roller, said suction head being movable in directions toward and from the apron, means movable in the arc of a circle for transferring the cut wrapper from the cutting die when the latter is in its advanced position and delivering it upon the apron, and means for delivering a filler charge of tobacco onto the apron.

In testimony whereof I have hereunto set my hand in presence of two subscribing witnesses.

JAMES H. CHAMBERS.

Witnesses:
ROBT. H. GERMAND,
JASPER M. BERRY, Jr.

Copies of this patent may be obtained for five cents each, by addressing the "Commissioner of Patents, Washington, D. C."